(12) United States Patent
Creed et al.

(10) Patent No.: US 7,966,237 B2
(45) Date of Patent: Jun. 21, 2011

(54) CENTRAL PRICING SYSTEM AND METHOD

(75) Inventors: Donal Martin Creed, Princeton Junction, NJ (US); Richard James Borina, Northport, NY (US)

(73) Assignee: Barclays Capital Inc., New York, NY (US)

(*) Notice: Subject to any disclaimer, the term of this patent is extended or adjusted under 35 U.S.C. 154(b) by 503 days.

(21) Appl. No.: 11/239,887

(22) Filed: Sep. 30, 2005

(65) Prior Publication Data

US 2007/0078748 A1   Apr. 5, 2007

(51) Int. Cl.
*G06Q 40/00* (2006.01)
(52) U.S. Cl. .................. 705/35; 705/1; 705/20; 705/26; 705/26.4; 705/36; 705/36 R; 705/37
(58) Field of Classification Search ............... 705/10, 705/35–45
See application file for complete search history.

(56) References Cited

U.S. PATENT DOCUMENTS

| | | | | |
|---|---|---|---|---|
| 5,297,032 | A * | 3/1994 | Trojan et al. | 705/37 |
| 5,758,328 | A * | 5/1998 | Giovannoli | 705/26 |
| 6,405,204 | B1 * | 6/2002 | Baker et al. | 705/36 R |
| 6,839,686 | B1 * | 1/2005 | Galant | 705/36 R |
| 7,099,838 | B1 * | 8/2006 | Gastineau et al. | 705/35 |
| 7,356,499 | B1 * | 4/2008 | Amburn | 705/37 |
| 7,440,911 | B1 * | 10/2008 | Fors et al. | 705/26.4 |
| 2002/0032610 | A1 * | 3/2002 | Gold et al. | 705/20 |
| 2002/0099636 | A1 * | 7/2002 | Narumo | 705/36 |
| 2002/0188543 | A1 * | 12/2002 | Wizon et al. | 705/36 |
| 2003/0023525 | A1 * | 1/2003 | Chen | 705/35 |
| 2003/0083974 | A1 * | 5/2003 | Bunda | 705/37 |
| 2004/0019549 | A1 * | 1/2004 | Gulbrandsen | 705/36 |
| 2005/0091146 | A1 * | 4/2005 | Levinson | 705/37 |
| 2005/0203825 | A1 * | 9/2005 | Angle et al. | 705/37 |
| 2006/0010064 | A1 * | 1/2006 | Noriega et al. | 705/37 |
| 2006/0112001 | A1 * | 5/2006 | Perales | 705/37 |
| 2006/0173693 | A1 * | 8/2006 | Arazi et al. | 705/1 |
| 2006/0229969 | A1 * | 10/2006 | Georgakopoulos | 705/37 |
| 2007/0050280 | A1 * | 3/2007 | Madle et al. | 705/37 |
| 2010/0174637 | A1 * | 7/2010 | Bok et al. | 705/37 |

FOREIGN PATENT DOCUMENTS

WO   WO2005060438   *   7/2005

OTHER PUBLICATIONS

Singhvi, Vandana. Investor sentiment: Its Measurement and Dimensions. New York University, Graduate School of Business Administration. vol. 6308A of Dissertations Abstracts International. ©2001.*

* cited by examiner

*Primary Examiner* — Charles R Kyle
*Assistant Examiner* — Robert R Niquette
(74) *Attorney, Agent, or Firm* — Morgan Lewis & Bockius LLP

(57) ABSTRACT

A system and method for providing responses to pricing inquiries that bypasses the trading desk is disclosed that includes a CPS database configured to receive and store pricing data from at least one data source and a CPS console configured to receive a pricing inquiry, estimate a price for the issue, and automatically generate and distribute the estimated price. A Pricing Analyst (PA) manages the receipt and processing of the pricing inquiry and can modify the estimation parameters through the CPS console. Processing of the inquiry by the CPS console relieves traders at the trading desk of the job of responding to pricing inquiries during the trading day.

16 Claims, 11 Drawing Sheets

| Cusip | Source | Eval Key | Eval Time | Mark Time | Price | Spread | Bench | Size |
|---|---|---|---|---|---|---|---|---|
| 210 | 220 | 230 | 240 | 250 | 260 | 270 | 280 | 290 |

| | Duration | 1 - 3 | 3 - 5 | 5 - 10 | 10-30 |
|---|---|---|---|---|---|
| Sector | Quality | | | | |
| IND | AAA/AA | 0.60 | 0.70 | 0.65 | 0.40 |
| IND | A | | | | |
| IND | BAA1 | | | | |
| IND | BAA2 | | | | |
| IND | BAA3 | | | | |
| TEL | AAA/AA | | | | |
| TEL | A | | | | |
| TEL | BAA1 | | | | |
| TEL | BAA2 | | | | |
| TEL | BAA3 | | | | |

CENTRAL PRICING SYSTEM AND METHOD

BACKGROUND OF THE INVENTION

1. Field of the Invention

The present invention relates to automated systems and methods for responding to price inquiries for securities and commodities and more specifically for inquires for fixed income securities.

2. Description of the Related Art

Sales and trading personnel must often respond to pricing inquiries throughout the day from internal and external clients. Responding to these requests can comprise a significant fraction of the trader's day. Furthermore, the requested price may be inconsistent between the various sources during the day. Therefore, there remains a need for systems and methods for efficiently providing improved accuracy and consistency of pricing information given to clients.

SUMMARY OF THE INVENTION

A system and method for providing responses to pricing inquiries that bypasses the trading desk is disclosed that includes a CPS database configured to receive and store pricing data from at least one data source and a CPS console configured to receive a pricing inquiry, estimate a price for the issue, and automatically generate and distribute the estimated price. A Pricing Analyst (PA) manages the receipt and processing of the pricing inquiry and can modify the estimation parameters through the CPS console. Processing of the inquiry by the CPS console relieves traders at the trading desk of the job of responding to pricing inquiries during the trading day.

One embodiment of the present invention is directed to a central pricing system comprising: a CPS database configured to receive and store pricing data from at least one data source; and a CPS console configured to receive a pricing inquiry for an issue, estimate a price for the issue, and automatically generate and distribute the estimated price. In an aspect of the present invention, the CPS console further comprises: a processor configured to receive the pricing inquiry and forward the inquiry to a trading desk at the direction of a Pricing Analyst (PA); an estimator configured to receive the inquiry from the processor and estimate a price for the issue based on pricing data from the CPS database; and a report generator configured to receive the estimated price and generate and distribute the estimated price. In an aspect of the present invention, the estimator uses an Option Adjusted Spread pricing model to estimate the price of the issue when the issue has no intraday data for a current day. In an aspect of the present invention, the estimator uses an Issuer Curve pricing model to estimate the price of the issue when the issue has no intraday data but has intraday data for an issuer of the issue at a different duration.

Another embodiment of the present invention is directed to a method for providing a response to a pricing inquiry while bypassing a trading desk, the method comprising: receiving a price inquiry for an issue; estimating a price for the issue based on at least one data source, the at least one data source stored in a CPS database; validating the estimated price based on available data stored in the CPS database; and reporting the validated price in response to the pricing inquiry. In an aspect of the present invention, the step of estimating further comprises: determining a single price for each of the at least one data source; determining a best mark for the issue from the single source price of the issue; and validating the best mark using available data stored in the CPS database. In an aspect of the present invention, a price is estimated based on the validated best marks for issues that have no intraday data; and validated using available data stored in the CPS database. In an aspect of the present invention, an Option Adjusted Spread (OAS) pricing model and/or an Issuer Curve pricing model is used to estimate the price

BRIEF DESCRIPTION OF THE DRAWINGS

The invention will be described by reference to the preferred and alternative embodiments thereof in conjunction with the drawings in which:

FIG. 2 is an illustration of a data structure that may be used as a mark in an embodiment of the present invention;

FIG. 4 is a portion of the OAS volatility matrix used in embodiments of the present invention;

FIG. 6 is an illustrative evaluation display in an embodiment of the present invention;

FIG. 8 is an illustrative intraday rules display used in an embodiment of the present invention;

FIG. 9 is an illustrative OAS matrix display used in an embodiment of the present invention;

FIG. 11 is an illustrative validation display used in an embodiment of the present invention.

DETAILED DESCRIPTION

The description herein should be understood to describe only one preferred embodiment of the invention. Those skilled in the art will recognize, for example, that the described embodiment is just one simplified example of the novel system and method of providing automated pricing information for securities and commodities. The simplified example is all that needs to be described in detail in order to enable the more general system and method that the invention comprises. Although bonds are used as an example of a security, it is understood that embodiments of the present invention may be used, and are within the scope of the present invention, for pricing securities and commodities such as, for example, debt, equity, synthetics, derivatives, futures, capital securities, and preferred securities.

Figure 1:
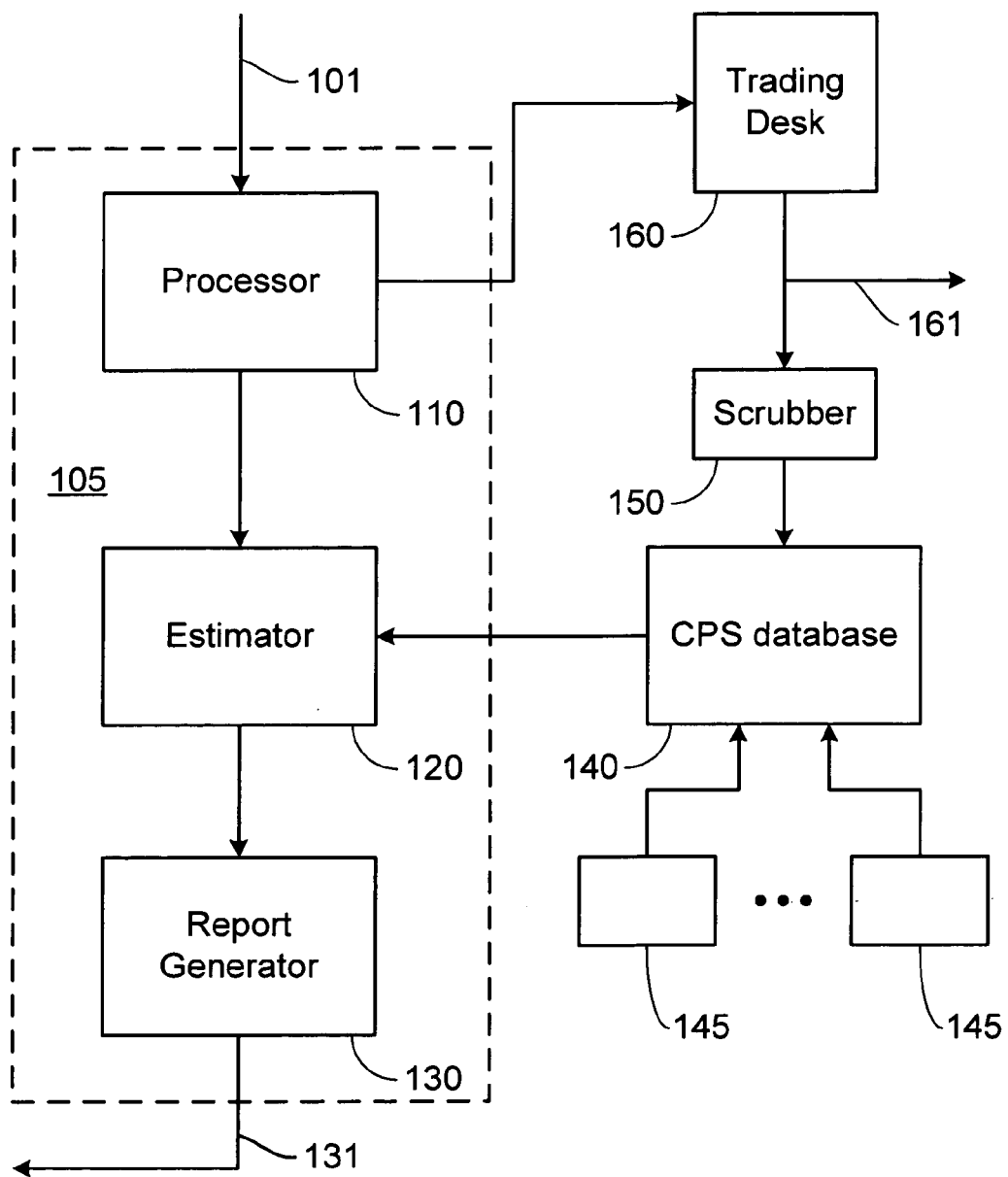
FIG. 1 is a component block diagram illustrating an embodiment of the present invention.

FIG. 1 is a component block diagram illustrating an embodiment of the present invention. In FIG. 1 a processor 110 receives a price inquiry 101 from a client and forwards the inquiry to an estimator 120 or to a trading desk 160 depending on the security. As an illustrative example, complex or peculiar securities such as, for example, synthetics or cash CDO's may be directed to the trading desk 160. Conversely, inquiries for relatively active or liquid bonds may be directed to the estimator 120.

The trading desk 160 represents a group of traders that trade the securities. Each trader specializes in a small group of securities and is normally responsible for providing responses to pricing inquiries for issues in his/her specialty. Responding to pricing inquiries, however, distracts the trader from his/her primary function of trading and following the issues in his/her specialty. Complex, peculiar or illiquid securities may still require the attention of the trader at the trading desk but active or liquid bonds, where intraday data exists, may be estimated by a Pricing Analyst (PA) instead of a trader, thereby reducing distractions to the trader.

The estimator 120 estimates the price of the requested security based on the information provided from a CPS database 140. The estimated price is forwarded to a report generator 130 that generates and forwards an inquiry response 131 to the requesting client. In a preferred embodiment, the inquiry response is sent via email. In another embodiment, the response may be sent as a spreadsheet if the client has requested prices for more than one security.

A CPS console 105 provides a common user interface to the processor 110, estimator 120, and report generator 130 that allows a Pricing Analyst (PA) to efficiently manage the inquiry process cycle.

In FIG. 1, the CPS database 140 is configured to receive trading and pricing data from multiple sources 145. Sources 145 may include third party data vendors such as, for example, EJV, IDC, Market Access, Tradeweb, Trader Bloomberg Runs, Broker Bloomberg Runs, Last Index, Last Trader Mark (Index), Bloomberg Tradebook, and other Buyside feeds and Broker/Dealer feeds. Sources 145 may also include proprietary sources such as, for example, a company's internal trading system. The CPS database 140 is configured to receive trader's marks from the trading desk 160. In some embodiments, traders provide marks on about 400 securities that are sent through a communication channel 161 to sales or other personnel that use the information provided in the marks. A scrubber 150 listens to the communication channel 161 and captures each mark and forwards the mark to the CPS database 140. In a preferred embodiment, the communication channel is an email system.

FIG. 2 is an illustration of a data structure that may be used as a mark for each security in an embodiment of the present invention. In FIG. 2, the mark includes fields for a Cusip 210, Source 220, Evaluation Key 230, Evaluation Time 240, Mark Time 250, Price 260, Spread 270, Bench 280, and Size 290. The Cusip field 210 uniquely identifies the issuer and issues of financial instruments, the Source field 220 identifies the source of that mark, the Evaluation Key 230 is a unique identifier for each mark in the CPS database. The Spread represents a risk premium, measured in basis points, that is applied to the treasury benchmark. The Bench identifies the treasury issue that the spread is applied to. The order of each field in the mark does not matter as long as the same order is used consistently. The consistent format used by the trading desk 160 allows for automated capture of marks sent by the trading desk 160. The captured marks are stored in the CPS database 140.

A sales representative or approved client may submit a list of securities, identified by their Cusip, through a user interface provided on the company's intranet. Various types of inquiries may be submitted, such as, for example, a price inquiry on an identified security, a price challenge, or an urgent price inquiry. A price challenge occurs when a client disagrees with the published mark and sends an inquiry that contains a mark that the client believes to be correct. Responses to a price inquiry are normally sent at the end of the day and responses to urgent price inquiries are sent preferably within 30 minutes.

The processor 110 receives the inquiry request, formulates an inquiry and stores the inquiry in the CPS database. The processor 110 is configured to generate inquiries from a spreadsheet or text file containing cusips and associated comments. For each Cusip in the inquiry, the processor 110 checks the Cusip against an Enterprise Security Master (ESM) database that contains a master list of securities traded by the company. If the Cusip does not have a corresponding ESM record, no price will be available. After each Cusip has been checked against the ESM database, the processor 110 generates and sends a confirmation email to the requester that identifies the Cusips that are being processed and the Cusips where pricing information is not available.

Each inquiry is reviewed by a PA through the CPS console. The PA initiates the estimator to evaluate and verify marks for each inquiry. If the inquiry is rejected by the estimator, the PA determines whether the mark can be evaluated from existing available marks and determines if the inquiry should be sent to a trader at the trading desk. The PA flags the inquiry for the trader and assigns the inquiry to the appropriate trader.

Figure 3:
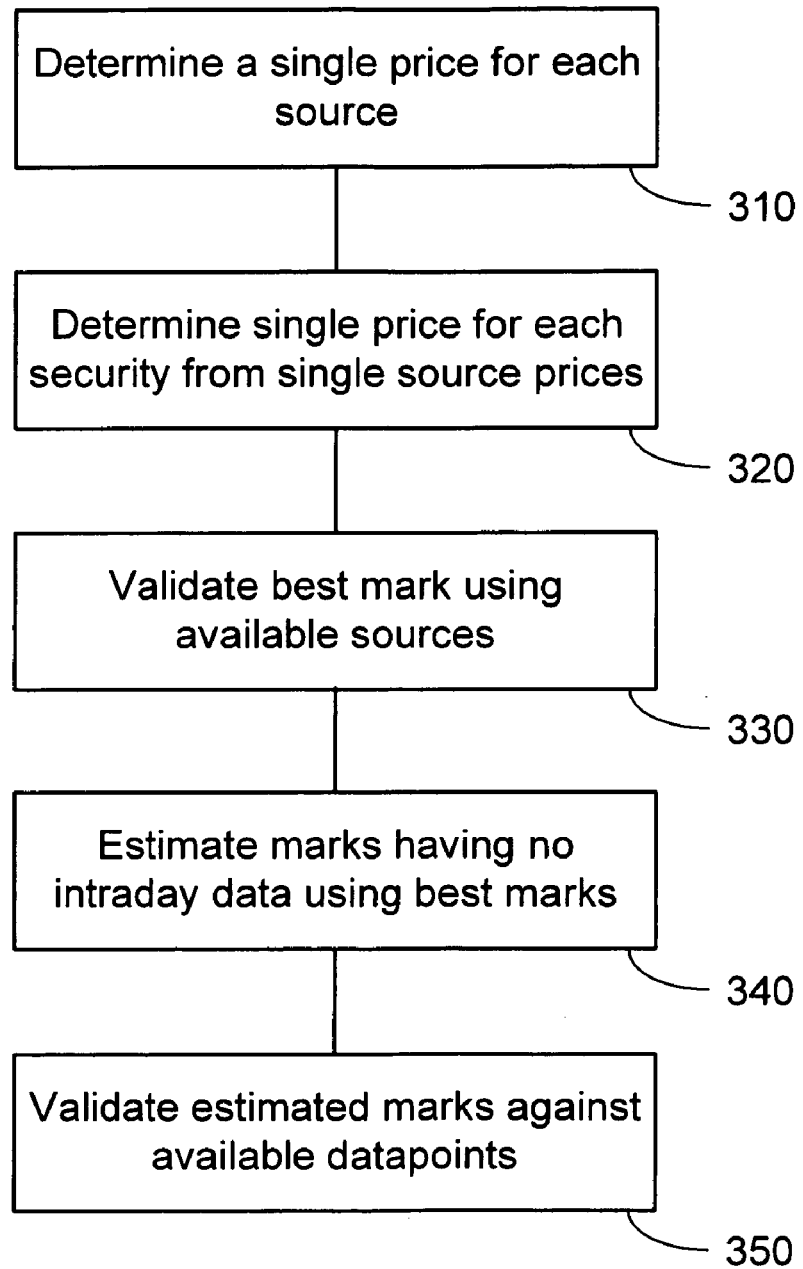
FIG. 3 is a flow chart illustrating an embodiment of the present invention.

FIG. 3 is a flow chart illustrating the process the estimator follows in estimating or evaluating a mark. In a preferred embodiment, the estimator is run automatically. In step 310, the estimator determines a single price (intraday mark) at evaluation time for each source providing a series for real-time, intraday prices. Examples of real-time sources include Trace marks, trades reported in the company's proprietary system, and trader marks distributed from the trading desk. In step 320, a single valuation price (best intraday mark) per security is determined from one or more of the single source prices determined in step 310. In step 330, the single valuation price from step 320 is verified using all available sources. If the single valuation price cannot be verified in step 320, the estimator rejects the inquiry and notifies the PA of the rejection. If step 330 verifies the mark estimated in step 320, the mark estimated in step 320 is used to estimate marks for inquiries that do not have intraday data in step 340. In step 340, pricing models such as, for example, an OAS matrix or Issuer Curve pricing models may be used independently or in combination to estimate marks with no intraday data from the marks evaluated in step 320. In step 350, the estimated marks are validated against all other data available.

In some embodiments, intraday prices may be obtained through three sources: trader runs through Bloomberg emails; Trace marks; and trades reported in the Laura system. Trader runs, also referred to as BBG runs or Bloomberg runs, are the markets that a broker/dealer's traders make on the bonds that they trade. The traders send the information to the broker/dealer's salesforce to indicate where the traders believe bonds should trade in order to generate business. Trace marks are trades that have occurred over the course of the day. Market participants are required to post all completed trades to the trade system within 15 minutes of the completion of the trade. Laura trades are trades executed by Lehman Brothers traders. Different evaluation rules may be applied to different intraday price sources to determine the single intraday price for each source. For example, the intraday price for the Trace source may be the most recent round lot mark of the day or the most recent mark if there is has been no round lot trade (a trade of more than one million dollars) during the day. In another example, the intraday price for a BBG run is the most recent bid-side mark of the day. The intraday price may be adjusted depending on the level of the five day trace volume of the security or on identity or type of the buyer or seller. The five day trace volume is the average trading volume that has occurred over the most recent five trading days.

In some embodiments, a combination of mark age and source priority may be used to determine the best intraday mark. The age of a mark may be filtered by the PA by setting a time window limiting the marks used to determine the best intraday mark. A default window of 6:00 AM to 5:00 PM, for example, may be set such that all marks for that day are used to determine that best intraday mark. A narrower window, however, may be set by the PA to account for important events, such as a Fed announcement, that occur during the day.

The best intraday mark may be selected according to a priority hierarchy of intraday sources. For example, in some embodiments, the trader/Bloomberg marks have a higher priority than the Laura trade marks, which in turn have a higher priority than the trace marks. In some embodiments, the best intraday mark is selected from the most recent trader mark or Bloomberg mark. If a trader or Bloomberg mark is not available for that day, the best intraday mark is selected from a Laura mark if the Laura mark is less than one hour old. Otherwise, the best intraday mark is the most recent Laura mark or trace mark.

The PA may override one or more sources used to determine the best intraday mark for a particular issue or security. The PA may also add comments at the issue level than may be viewed by the trading desk.

A blended intraday mark may be determined to assist in the validation of the best intraday mark. The PA may select one or more sources that are used to determine the blended mark. The sources may provide intraday marks or beginning-of-day (BOD) marks. In some embodiments, each source used to determine the blended intraday mark is weighted according to the source of the mark, the age of the mark, and the size of the mark. Generally, intraday sources may be assigned higher weights than BOD sources. Similarly, younger marks may be assigned higher weights than BOD or older marks. Marks for larger size trades may be assigned higher weights than marks for smaller size trades. The blended intraday mark may be compared to the best intraday mark and if the difference between the blended intraday mark and the best intraday mark is above a predefined threshold, the PA may be notified or the best intraday mark may be rejected.

After the best intraday mark has been determined, the PA may validate the best intraday mark against one or more validation rules. The PA may select the validation rules and any tolerance values associated with the selected rule. If the validation rule is violated, the best intraday mark is marked as rejected for review by the PA prior to the running of the price estimation models.

The best intraday mark may be rejected in a volatile market if the source of the best intraday mark is stale. For example, if a Bloomberg Run or Trader mark was used to determine the best intraday mark and the volatility matrix for that sector is greater than a preset volatility threshold and there are more recent Trade or Trace marks that are more than a preset difference from the best intraday mark, then the best intraday mark is rejected.

The best intraday mark may be rejected in a flat market if the best intraday mark is not within a preset threshold. For example, if an odd lot Trace or Laura Trade was used to determine the best intraday mark and the volatility for that sector is less than a preset threshold and the best intraday mark differs from the BOD mark by more than a second preset threshold value, then the best intraday mark is rejected. In another example, the best intraday mark may be rejected if the daily OAS % change is greater than a preset threshold value when the volatility of the other issues with the same sector, quality, and duration as the mark's issue is less than a second preset threshold.

The best intraday mark may be rejected if it excessively differs from the other intraday marks for the bond. For example, if the best intraday mark is more than a preset number of standard deviations from the average of all intraday marks for the issue, the best intraday mark is rejected.

The best intraday mark may be rejected if the direction of the mark is against the issuer direction. For example, the best intraday mark may be rejected if the OAS % change for the mark is moving in a contrary direction to the other intraday issues for the same issuer. The OAS % change is the amount the option adjusted spread (OAS) has changed, on a percentage basis, from the prior trading day.

The best intraday mark may be rejected if the speed of the mark's movement excessively differs from the issuer activity. For example, if the daily OAS % change is more than a preset number of standard deviations from the average OAS % change for the issuer, the best intraday mark may be rejected.

The best intraday mark may be rejected if the direction of the mark is against the sector direction. For example, if the daily OAS % change is moving in a contrary direction to the intraday issues having the same sector, quality and duration of the mark, the best intraday mark may be rejected.

The best intraday mark may be rejected if the speed of the mark's movement excessively differs from the sector activity. For example, if the daily OAS % change is more than a preset number of standard deviations from the average OAS % change for other issues having the same sector, quality and duration of the mark's issue, the best intraday mark may be rejected.

The best intraday mark may be rejected if the issue is illiquid. For example, if the best intraday mark is determined from trades with a 5-day volume of less than a preset volume threshold, the best intraday mark may be rejected.

The validated best intraday marks are used to estimate marks for issues that have no intraday data for that day. The estimates are based on pricing models such as, for example, the Option Adjusted Spread (OAS) pricing model and the Issuer Curve pricing model, although other pricing models may be used and are within the scope of the present invention.

An OAS volatility matrix is calculated based on the validated best intraday marks. FIG. 4 shows a portion of the OAS volatility matrix. The OAS volatility matrix includes a cell 450 for each combination of sector 410, quality 420, and duration 430. The value in each cell represents the average variance of the OAS % values for the corresponding combination of sector, quality, and duration. In FIG. 4, only two sectors are shown but other sectors may be included and are within the scope of the present invention. Similarly, the partitions for duration and quality are for illustrative purposes and other partitions may be used without exceeding the scope of the present invention.

In the OAS pricing model, the OAS % change for every best intraday mark within the same sector, maturity, and quality are averaged. The averaged percent change is applied to the BOD price for the other issues in the same sector, maturity, and quality to estimate the price of issues that have no intraday information available.

The PA may exclude specific intraday issues from contributing to the averaged percent change and may adjust the actual OAS matrix, which is a matrix containing the averaged percent change for each combination of sector, quality, and duration. The PA may also review and approve the results of the OAS pricing model before applying the Issuer Curve model.

The Issuer Curve pricing model may be used to estimate a price of an issue when the issue's cell contains no intraday information. In the example shown in FIG. 4, if there is intraday information on the same issuer for three of the four duration partitions shown in FIG. 4, the average variance of the OAS delta may be interpolated from the information in the three partitions for the other durations. The interpolated average variance may be used to estimate the price of the issue from the BOD price.

The estimates from the OAS matrix pricing model and the Issuer Curve pricing model may be merged together with the Issuer Curve estimate taking precedence over the OAS matrix estimate.

The estimates are validated based on validation rules that are selected by the PA. An estimated mark may be flagged as rejected, for example, if there is a large difference between the estimated mark and the corresponding mark provided by a third-party pricing vendor such as, for example, IDC. The estimates of both pricing models may be reviewed by the PA and the estimated marks updated with corresponding spread and price data. The updated marks are preferably automatically distributed to the clients by the report generator.

Figure 5:
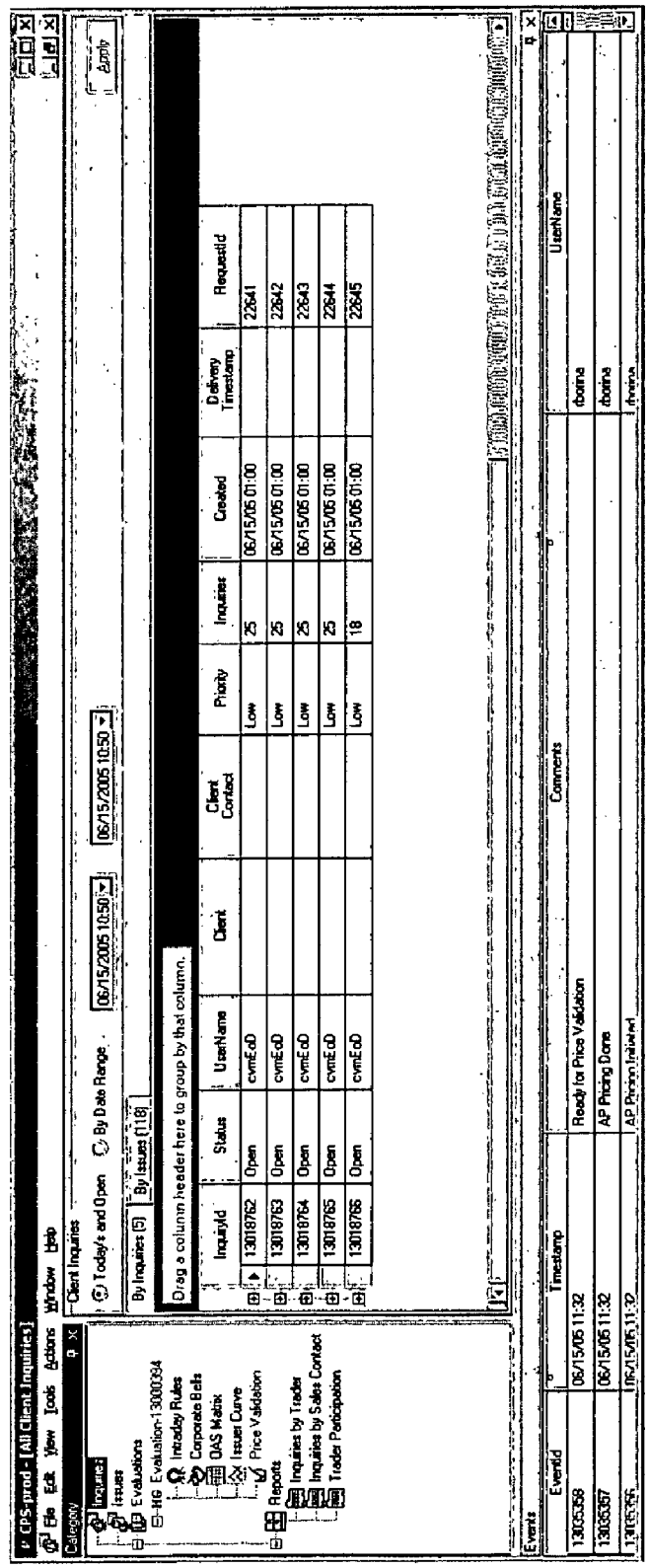
FIG. 5 is an illustrative display allowing the PA to view pricing inquiries in an embodiment of the present invention.

FIG. 5 is an illustrative display allowing the PA to view pricing inquiries in an embodiment of the present invention. The PA may select to view inquiries by inquiries or by issues and may display inquiries by date range or only the open inquiries for that day.

Figure 6:
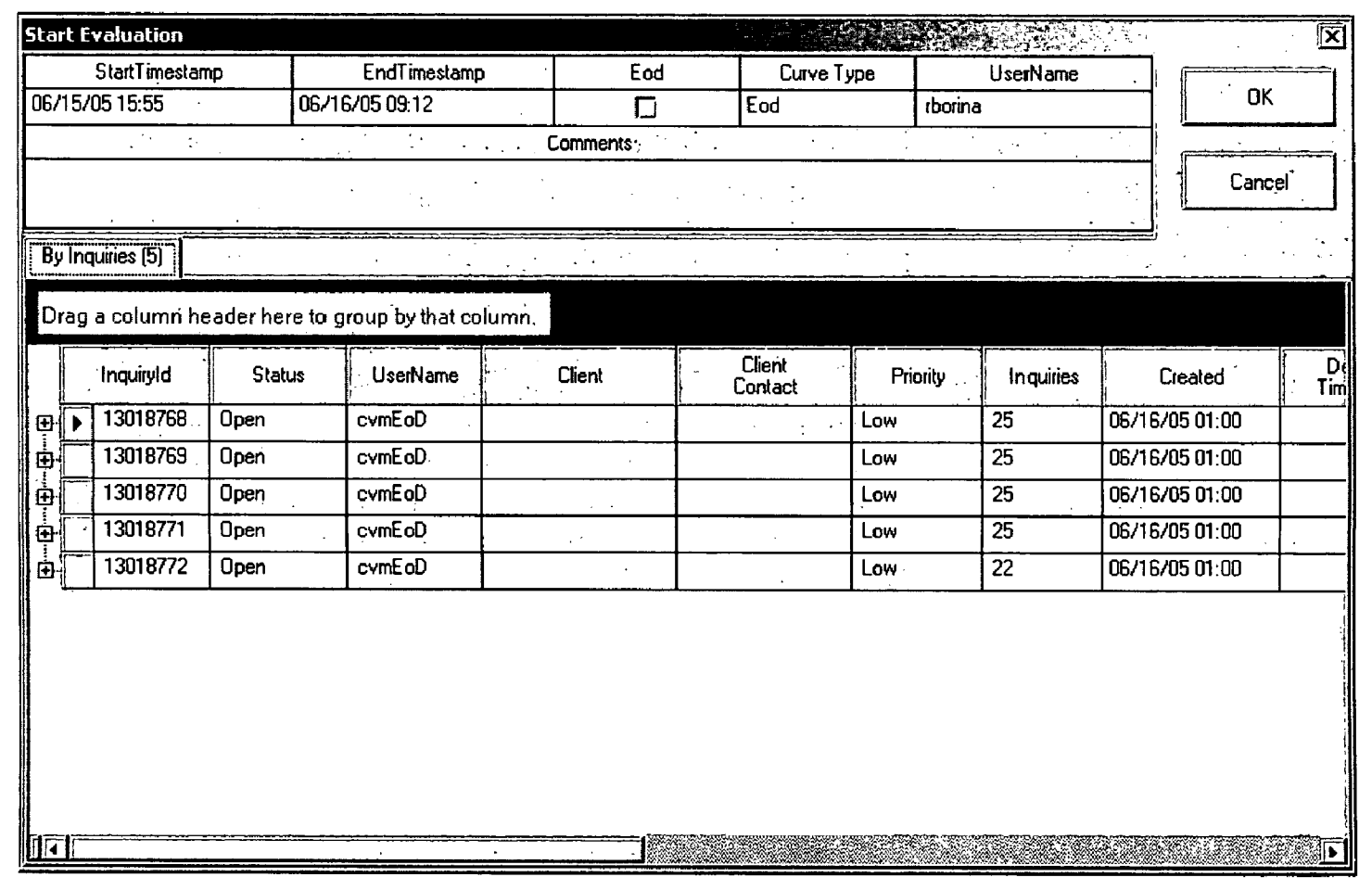

FIG. 6 is an illustrative evaluation display that allows the PA to select the inquiries to process for a given evaluation. The PA may check an End-of-Day (EOD) check box if an end-of-day evaluation is being run. The PA may specify a starting time period for the evaluation, which defines the time window used to estimate the marks. In some embodiments, the starting time is usually the end-of-day of the previous trading day.

Figure 7:
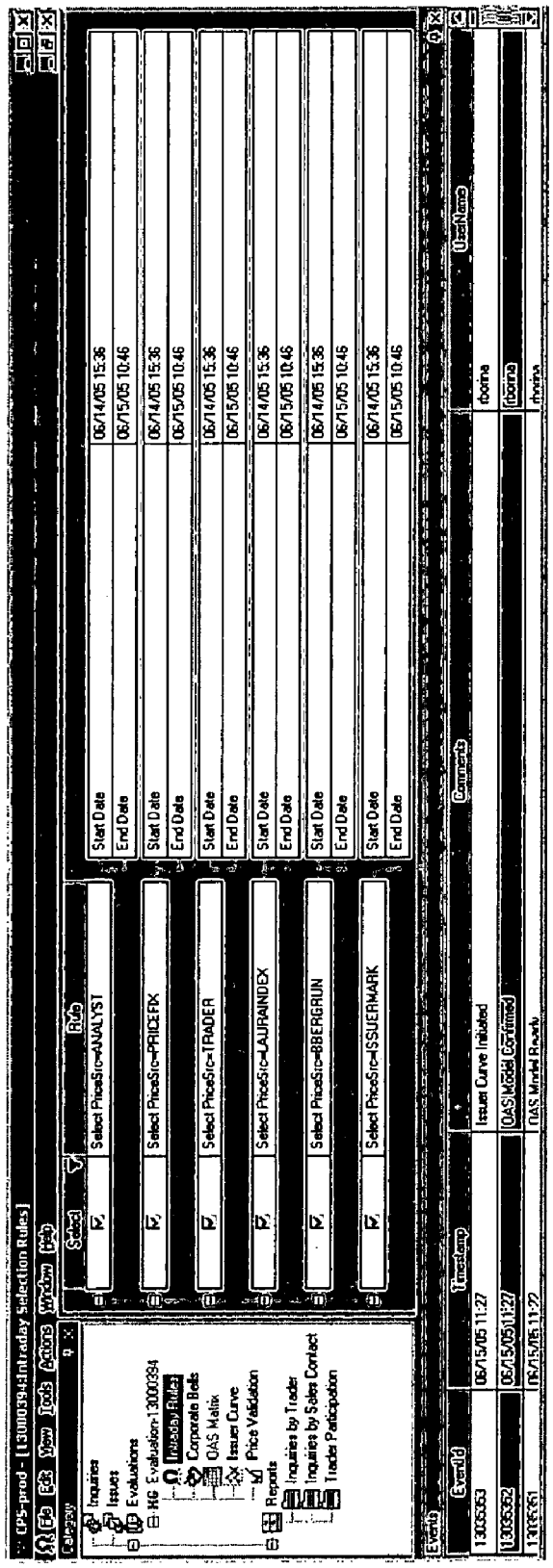
FIG. 7 is an illustrative intraday source display used in an embodiment of the present invention.

FIG. 7 is an illustrative display of intraday sources that the PA may select to include or exclude from the intraday price evaluation. The PA may also specify, for each intraday source, the time period of the intraday source that will be used for the price evaluation.

Figure 8:
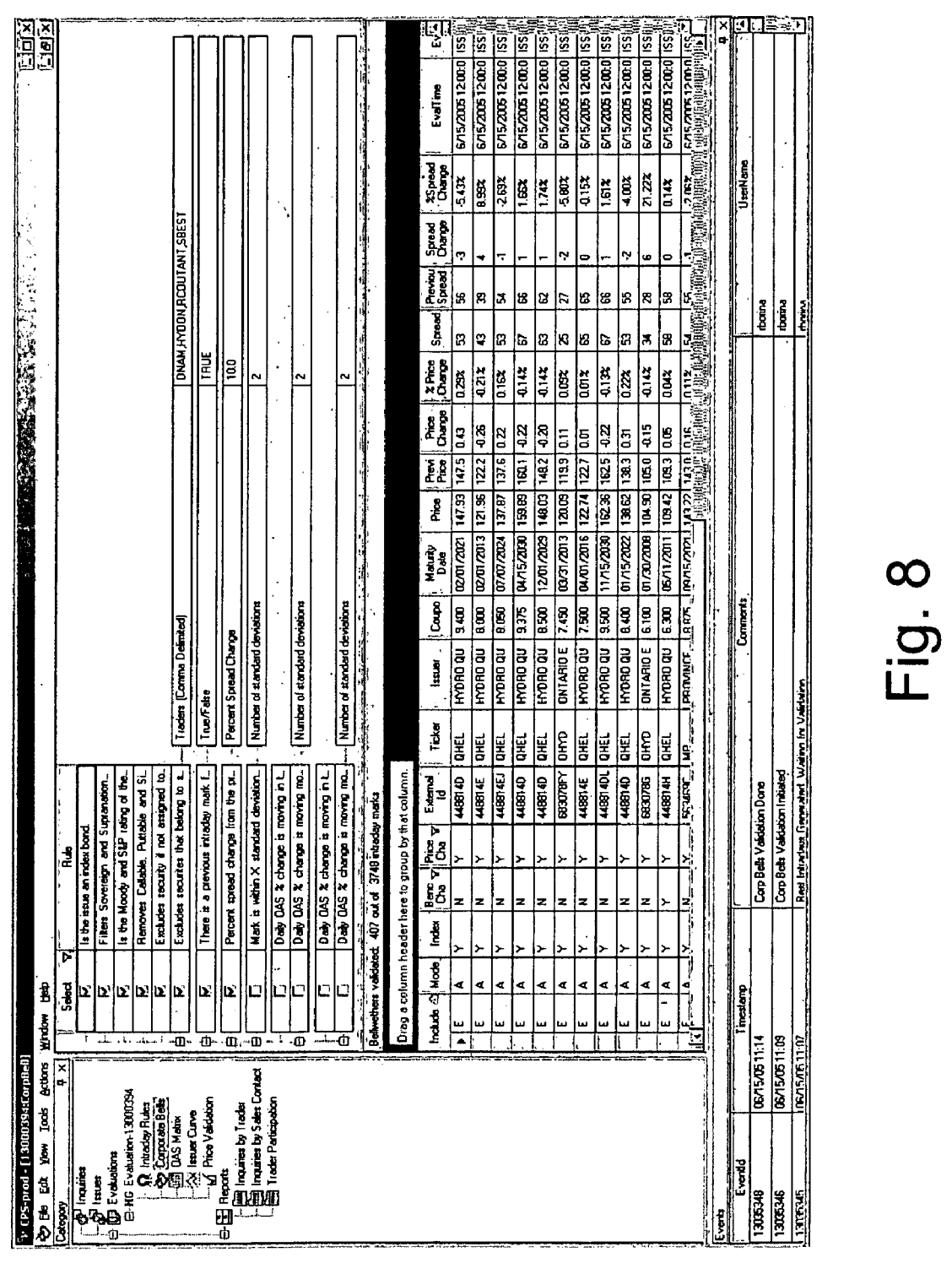

FIG. 8 is an illustrative display of intraday rules that the PA may select to evaluate the best intraday mark. The PA may also enter the appropriate threshold values associated with a particular rule in input fields to the right of the rule. Below the intraday rules displayed in FIG. 8, a window displays a set of bonds that have intraday marks associated with them. The rules selected in the top window of FIG. 8 are applied to the bonds listed in the bottom window of FIG. 8. Bonds that fail one of the selected rules are removed from the window and are excluded from the OAS pricing calculations.

Figure 9:
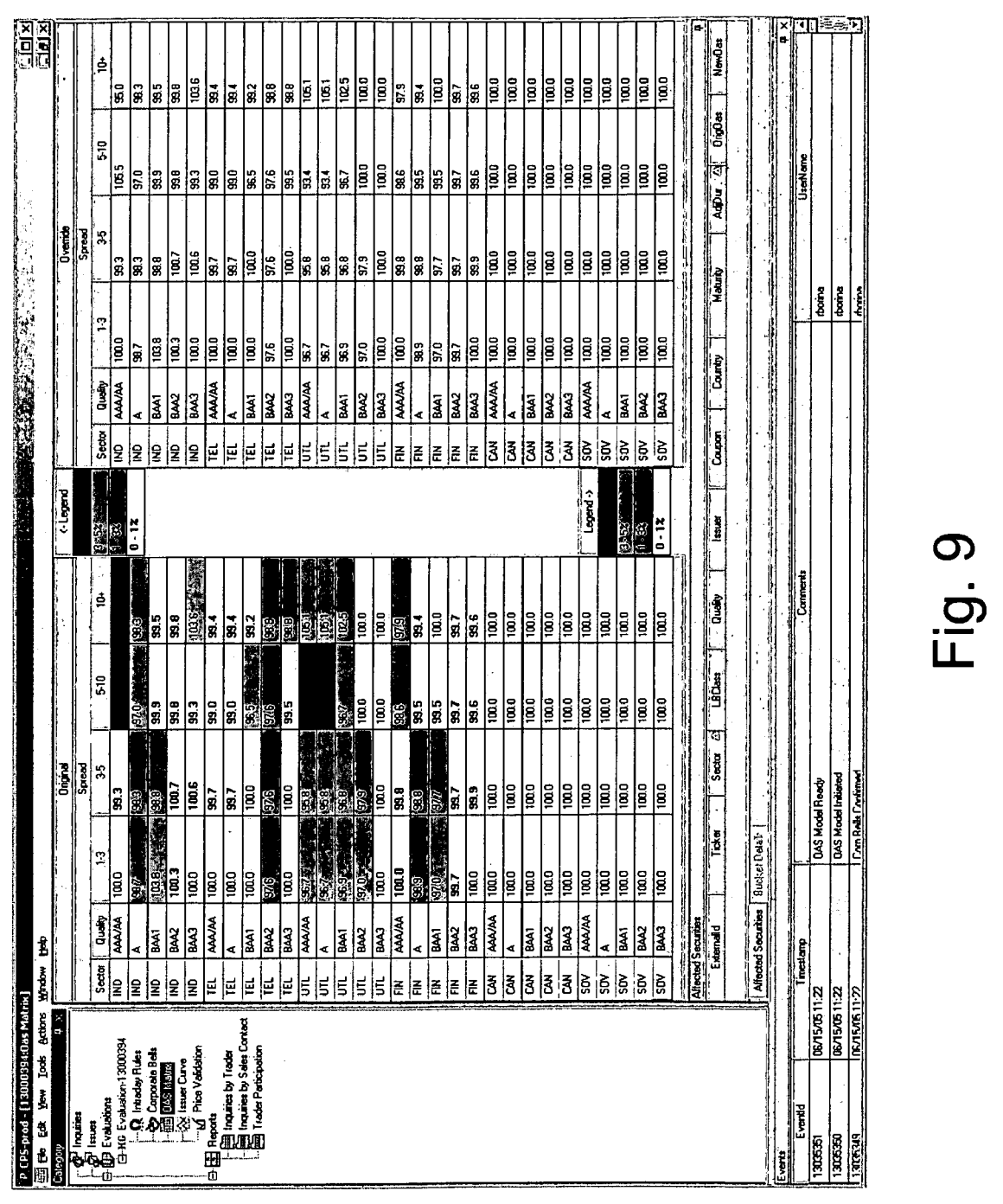

FIG. 9 is an illustrative OAS matrix display that the PA may view to verify that each cell in the matrix is representative of the day's market moves. The PA may override a specific cell in the matrix by entering a modification for that cell in the corresponding cell to the right of the OAS matrix. In a preferred embodiment, each OAS cell may be color-coded to represent large or significant activity in a cell. A legend may be provided between the OAS matrix and the modification matrix.

Figure 10:
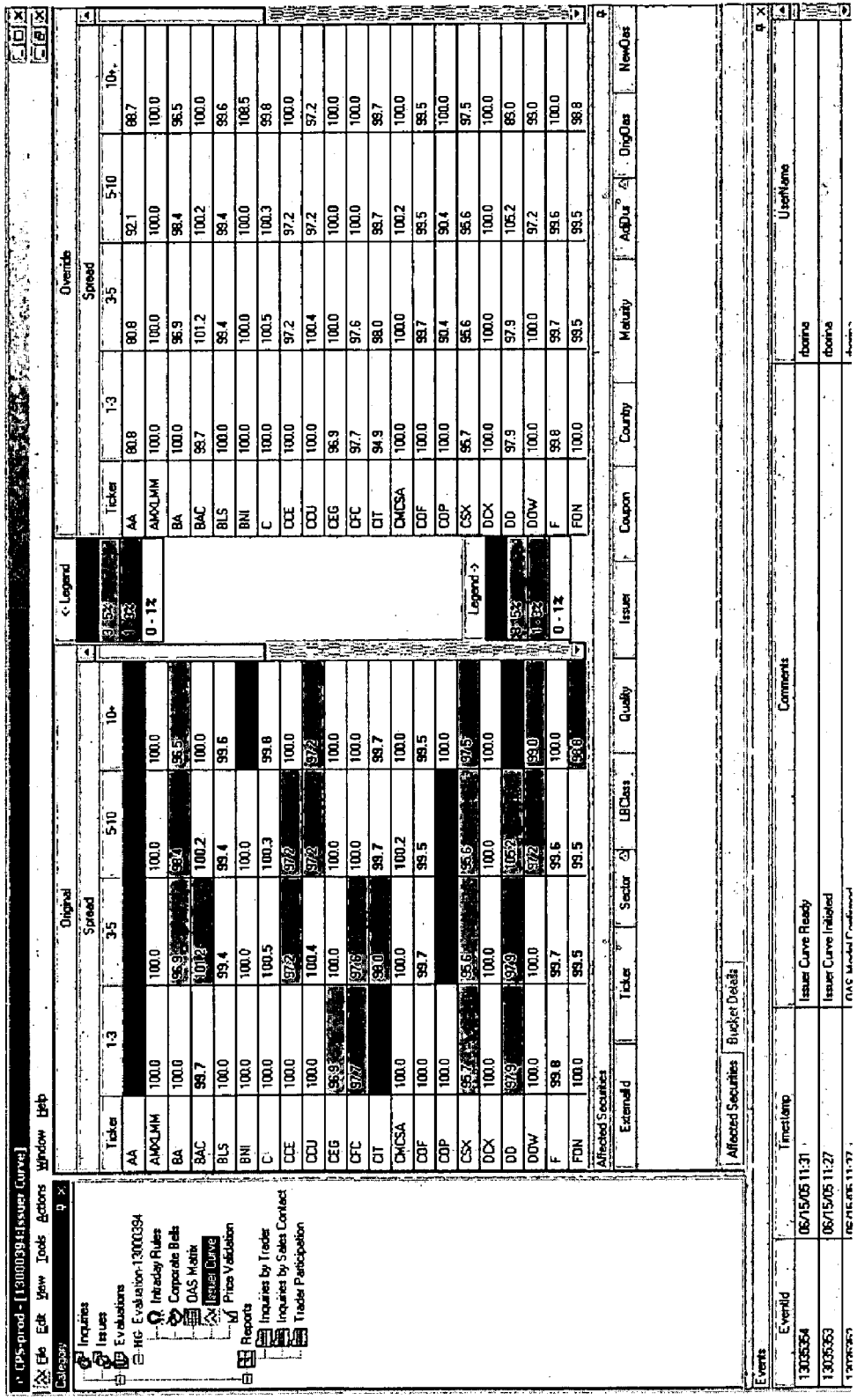
FIG. 10 is an illustrative Issuer Curve matrix display used in an embodiment of the present invention.

FIG. 10 is an illustrative Issuer Curve matrix display that the PA may view to verify that each cell in the matrix is representative of the day's market moves. The PA may override a specific cell in the matrix by entering a modification for that cell in the corresponding cell to the right of the Issuer Curve matrix. In a preferred embodiment, each Issuer Curve cell may be color-coded to represent large or significant activity in a cell. A legend may be provided between the Issuer Curve matrix and its modification matrix. Unlike the OAS matrix, which is partitioned by sector, quality, and duration, the Issuer Curve matrix is partitioned by issuer and duration. In FIG. 10, the issuer is displayed in the Ticker column.

Figure 11:
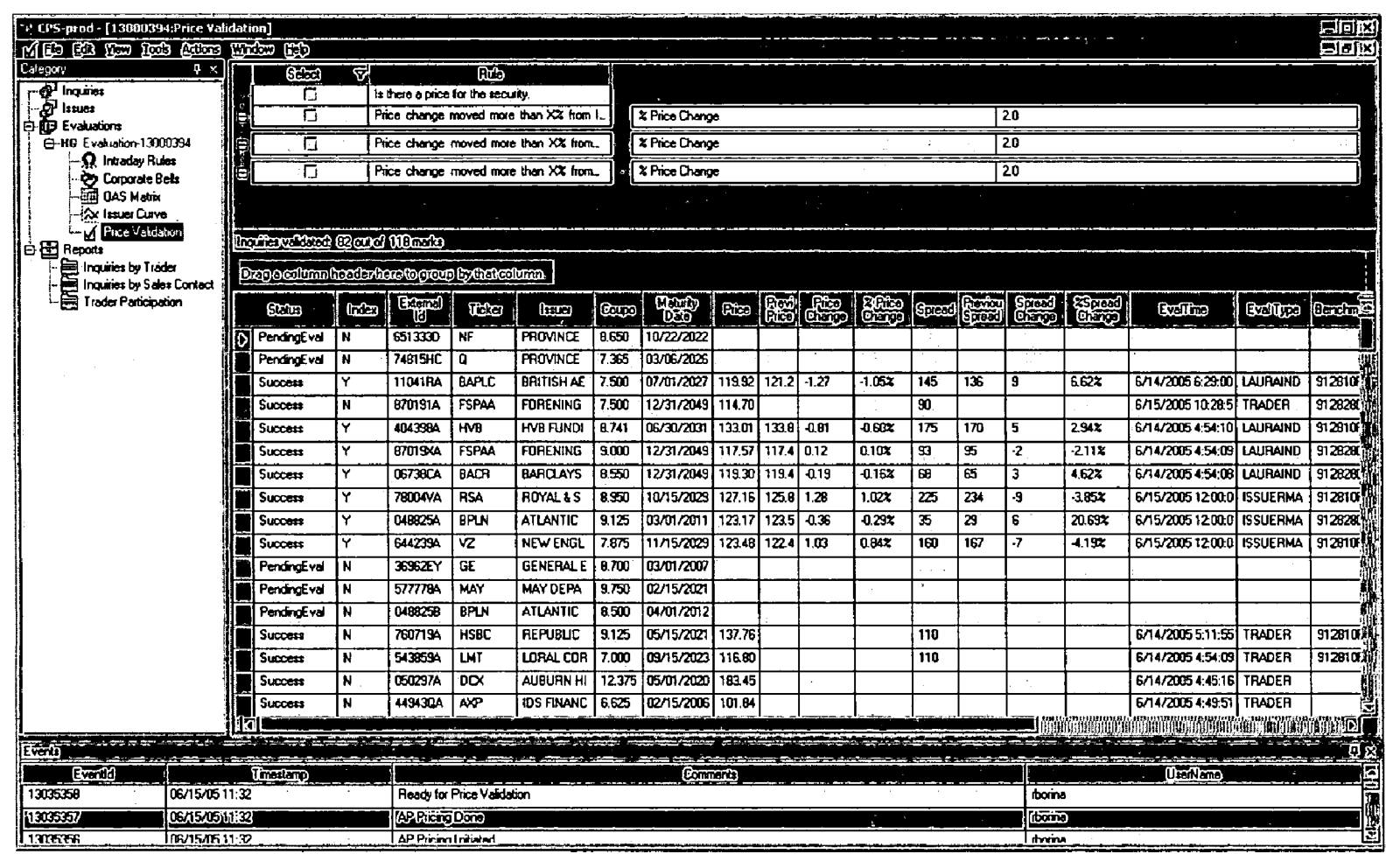

FIG. 11 is an illustrative price validation display that the PA may review to validate and confirm the prices for each bond. The PA may select a bond, choose to apply a validation rule, and modify a price if necessary. In a preferred embodiment, the validation display includes a status field indicating the status of the pricing inquiry. For example, the status may display "Success" to indicate that the bond has passed the validation rules. Similarly, the status may display "Pending" while waiting for a response from the trader, or the status may display "Failed" to indicate that the bond has either failed a validation test or the trader has failed to respond, and may double click on the bond to bring up a window displaying the pricing details for that bond for more detailed review.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A computer-implemented system for pricing securities and commodities, comprising:
   a processor that receives a pricing inquiry for an issue;
   a database configured to receive and store intraday prices for said issue, wherein said intraday prices are provided for said issue for a current day by at least two data sources;
   an estimator that estimates a current price for the issue based on said intraday prices by:
   determining that a beginning-of-day price for said issue is available but no intraday prices for said issue for a current day are available;
   accessing an average percentage change in option adjusted spread that is based on at least one other issue which has sector, quality, and maturity duration in common with said issue;
   determining an estimated intraday price for said issue based on said beginning-of-day price for said issue and said average percentage change in option adjusted spread for said at least one other issue; and
   applying said estimated current price as the current price for said issue when intraday prices are not available.

2. A computer-implemented method for providing a response to a pricing inquiry, the method comprising:
   receiving a price inquiry for an issue;
   accessing intraday prices for said issue from a database, wherein said intraday prices are provided for said issue for a current day by at least two data sources;
   determining that a beginning-of-day price for said issue is available but no intraday prices for said issue for a current day are available;
   accessing an average percentage change in option adjusted spread that is based on at least one other issue which has sector, quality, and maturity duration in common with said issue;
   determining an estimated intraday price for said issue based on said beginning-of-day price for said issue and said average percentage change in option adjusted spread for said at least one other issue; and applying said estimated current price as the current price for said issue when intraday prices are not available.

3. A computer-implemented method for providing a response to a pricing inquiry, the method comprising:

receiving a price inquiry for an issue;

accessing intraday prices for said issue from a database, wherein said intraday prices are provided for said issue for a current day by at least two data sources;

determining that a beginning-of-day price for said issue is available but no intraday prices for said issue for a current day are available;

accessing option adjusted spread deltas for at least three other issues which have issuer in common with said issue but which have maturity durations different from said issue;

determining an average variance of option adjusted spread delta based on said option adjusted spread deltas for said at least three other issues;

determining an estimated current price for said issue based on said beginning-of-day price for said issue and said average variance of option adjusted spread delta; and applying said estimated current price as the current price for said issue when intraday prices are not available.

4. A computer-implemented system for pricing securities and commodities, comprising:

a processor that receives a pricing inquiry for an issue;

a database configured to receive and store intraday prices for said issue, wherein said intraday prices are provided for said issue for a current day by at least two data sources;

an estimator that estimates a current price for the issue based on said intraday prices by:

determining that a beginning-of-day price for said issue is available but no intraday prices for said issue for a current day are available;

accessing option adjusted spread deltas for at least three other issues which have issuer in common with said issue but which have maturity durations different from said issue;

determining an average variance of option adjusted spread delta based on said option adjusted spread deltas for said at least three other issues;

determining an estimated current price for said issue based on said beginning-of-day price for said issue and said average variance of option adjusted spread delta; and applying said estimated current price as the current price for said issue when intraday prices are not available.

5. A computer-implemented system for pricing securities and commodities comprising:

a processor that receives a pricing inquiry for an issue;

a database configured to receive and store intraday prices for said issue, wherein said intraday prices are provided for said issue for a current day by at least two data sources;

an estimator that estimates a current price for the issue based on said intraday prices by:

selecting a single intraday price for each data source among said at least two data sources, from among said single intraday prices, selecting one as a best intraday price, applying at least one validation rule to said best intraday price; and in response to determining that said at least one validation rule is satisfied, providing said best intraday price as said current price of said issue, wherein the processor forwards an inquiry to a trading desk when the best intraday price cannot be validated by the estimator.

6. A computer-implemented system for pricing securities and commodities comprising:

a processor that receives a pricing inquiry for an issue;

a database configured to receive and store intraday prices for said issue, wherein said intraday prices are provided for said issue for a current day by at least two data sources;

an estimator that estimates a current price for the issue based on said intraday prices by:

selecting a single intraday price for each data source among said at least two data sources, from among said single intraday prices, selecting one as a best intraday price, applying at least one validation rule to said best intraday price;

in response to determining that said at least one validation rule is satisfied, providing said best intraday price as said current price of said issue;

estimating a current price for one or more issues that have no intraday price data, based on the best intraday price for said issue, to produce a second estimated price for said one or more issues that have no intraday price data; and validating the second estimated price using data stored in the database.

7. A computer-implemented system for pricing securities and commodities comprising:

a processor that receives a pricing inquiry for an issue;

a database configured to receive and store intraday prices for said issue, wherein said intraday prices are provided for said issue for a current day by at least two data sources;

an estimator that estimates a current price for the issue based on said intraday prices by:

selecting a single intraday price for each data source among said at least two data sources based on a most recent bid-side price of the day, from among said single intraday prices, selecting one as a best intraday price;

applying at least one validation rule to said best intraday price; and in response to determining that said at least one validation rule is satisfied, providing said best intraday price as said current price of said issue.

8. A computer-implemented system for pricing securities and commodities comprising:

a processor that receives a pricing inquiry for an issue;

a database configured to receive and store intraday prices for said issue, wherein said intraday prices are provided for said issue for a current day by at least two data sources;

an estimator that estimates a current price for the issue based on said intraday prices by:

selecting a single intraday price for each data source among said at least two data sources, from among said single intraday prices, selecting one as a best intraday price based on at least one of: age of said single intraday prices, and a priority hierarchy of said at least two data sources;

applying at least one validation rule to said best intraday price; and in response to determining that said at least one validation rule is satisfied, providing said best intraday price as said current price of said issue.

9. A computer-implemented system for pricing securities and commodities comprising:
a processor that receives a pricing inquiry for an issue;
a database configured to receive and store intraday prices for said issue, wherein said intraday prices are provided for said issue for a current day by at least two data sources;
an estimator that estimates a current price for the issue based on said intraday prices by:
selecting a single intraday price for each data source among said at least two data sources,
from among said single intraday prices, selecting one as a best intraday price;
determining a blended intraday price based on intraday prices from data sources other than the data source providing said best intraday price;
applying at least one validation rule to said best intraday price, wherein said validation rule is satisfied if a difference between said best intraday price and said blended intraday price is less than or equal to a threshold; and
in response to determining that said at least one validation rule is satisfied, providing said best intraday price as said current price of said issue.

10. A computer-implemented system for pricing securities and commodities comprising:
a processor that receives a pricing inquiry for an issue;
a database configured to receive and store intraday prices for said issue, wherein said intraday prices are provided for said issue for a current day by at least two data sources;
an estimator that estimates a current price for the issue based on said intraday prices by:
selecting a single intraday price for each data source among said at least two data sources,
from among said single intraday prices, selecting one as a best intraday price;
determining an average intraday price based on said intraday prices for said issue;
applying at least one validation rule to said best intraday price, wherein said validation rule is satisfied if said best intraday price is within a preset number of standard deviations from said average intraday price; and
in response to determining that said at least one validation rule is satisfied, providing said best intraday price as said current price of said issue.

11. A computer-implemented method for providing a response to a pricing inquiry, the method comprising:
receiving a price inquiry for an issue;
accessing intraday prices for said issue from a database, wherein said intraday prices are provided for said issue for a current day by at least two data sources;
selecting a single intraday price for each data source among said at least two data sources,
from among said single intraday prices, selecting one as a best intraday price;
applying at least one validation rule to said best intraday;
in response to determining that said at least one validation rule is satisfied, providing said best intraday price as said current price of said issue; and
forwarding an inquiry to a trading desk when the best intraday price cannot be validated.

12. A computer-implemented method for providing a response to a pricing inquiry, the method comprising:
receiving a price inquiry for an issue;
accessing intraday prices for said issue from a database, wherein said intraday prices are provided for said issue for a current day by at least two data sources;
selecting a single intraday price for each data source among said at least two data sources,
from among said single intraday prices, selecting one as a best intraday price;
applying at least one validation rule to said best intraday;
in response to determining that said at least one validation rule is satisfied, providing said best intraday price as said current price of said issue;
estimating a current price for one or more issues that have no intraday price data, based on the best intraday price for said issue, to produce a second estimated price for said one or more issues that have no intraday price data; and
validating the second estimated price using data stored in the database.

13. A computer-implemented method for providing a response to a pricing inquiry, the method comprising:
receiving a price inquiry for an issue;
accessing intraday prices for said issue from a database, wherein said intraday prices are provided for said issue for a current day by at least two data sources;
selecting a most recent bid-side price of the day as a single intraday price for each data source among said at least two data sources,
from among said single intraday prices, selecting one as a best intraday price;
applying at least one validation rule to said best intraday price; and
in response to determining that said at least one validation rule is satisfied, providing said best intraday price as said current price of said issue.

14. A computer-implemented method for providing a response to a pricing inquiry, the method comprising:
receiving a price inquiry for an issue;
accessing intraday prices for said issue from a database, wherein said intraday prices are provided for said issue for a current day by at least two data sources;
selecting a single intraday price for each data source among said at least two data sources,
from among said single intraday prices, selecting one as a best intraday price based on at least one of: age of said single intraday prices, and a priority hierarchy of said at least two data sources;
applying at least one validation rule to said best intraday price; and
in response to determining that said at least one validation rule is satisfied, providing said best intraday price as said current price of said issue.

15. A computer-implemented method for providing a response to a pricing inquiry, the method comprising:
receiving a price inquiry for an issue;
accessing intraday prices for said issue from a database, wherein said intraday prices are provided for said issue for a current day by at least two data sources;
selecting a single intraday price for each data source among said at least two data sources,
from among said single intraday prices, selecting one as a best intraday price;
determining a blended intraday price based on intraday prices from data sources other than the data source providing said best intraday price;
applying at least one validation rule to said best intraday price, wherein said validation rule is satisfied if a difference between said best intraday price and said blended intraday price is less than or equal to a threshold; and in response to determining that said at least one validation rule is satisfied, providing said best intraday price as said current price of said issue.

16. A computer-implemented method for providing a response to a pricing inquiry, the method comprising:

receiving a price inquiry for an issue;

accessing intraday prices for said issue from a database, wherein said intraday prices are provided for said issue for a current day by at least two data sources;

selecting a single intraday price for each data source among said at least two data sources, from among said single intraday prices, selecting one as a best intraday price;

determining an average intraday price based on said intraday prices for said issue;

applying at least one validation rule to said best intraday price, wherein said validation rule is satisfied if said best intraday price is within a preset number of standard deviations from said average intraday price; and in response to determining that said at least one validation rule is satisfied, providing said best intraday price as said current price of said issue.

* * * * *